(No Model.)
O. DOMALSKI.
COCOANUT GRATER.
No. 355,598. Patented Jan. 4, 1887.
Fig: 1.
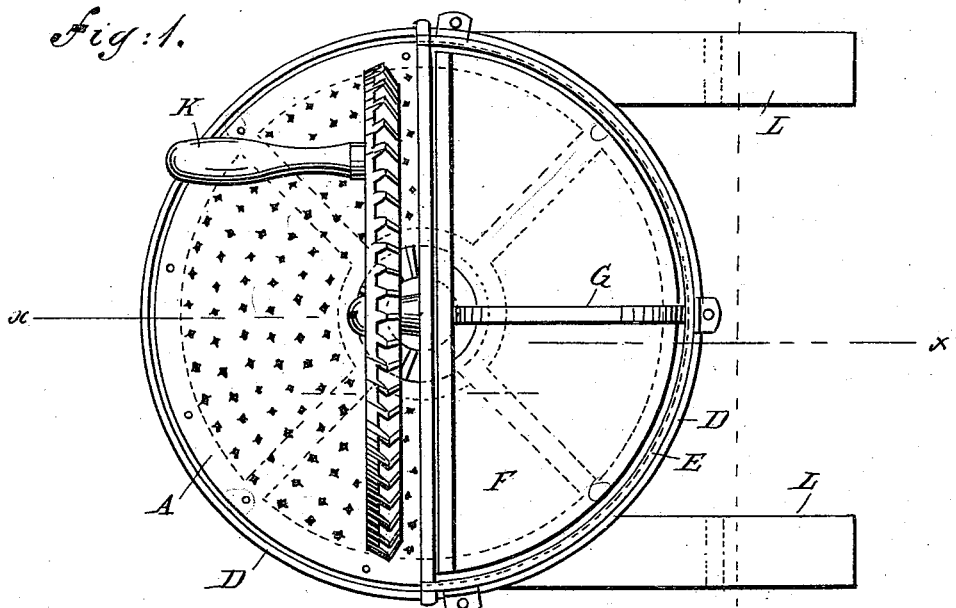
Fig: 2.
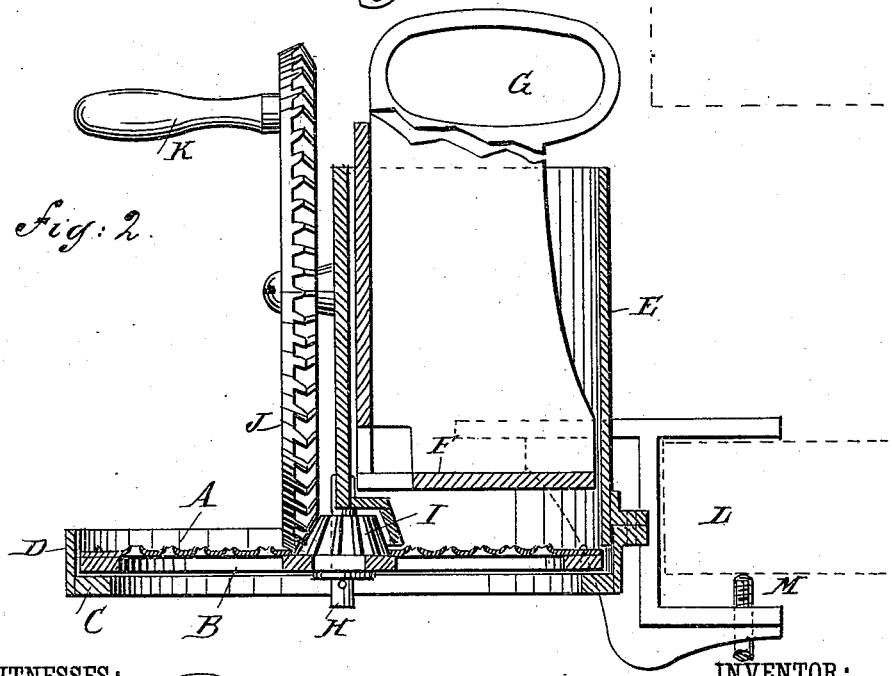
WITNESSES:
Chas. Nida
E. M. Clark
INVENTOR:
Oscar Domalski
BY Munn & Co
ATTORNEYS.

UNITED STATES PATENT OFFICE.

OSCAR DOMALSKI, OF BROOKLYN, NEW YORK.

COCOANUT-GRATER.

SPECIFICATION forming part of Letters Patent No. 355,598, dated January 4, 1887.

Application filed October 2, 1886. Serial No. 215,151. (No model.)

*To all whom it may concern:*

Be it known that I, OSCAR DOMALSKI, of Brooklyn, in the county of Kings and State of New York, have invented a new and Improved Cocoanut-Grater, of which the following is a full, clear, and exact description.

The object of my invention is to provide a new and improved cocoanut-grater which is simple in construction and effective in operation.

The invention relates to certain improvements in that class of vegetable-graters in which is employed a rotary disk having a perforated grating-surface and mounted to rotate horizontally, a hopper placed above the said disk, a plunger sliding in the said hopper, and means for rotating the said disk.

The invention consists of various parts and details and combinations of the same, as will be fully described hereinafter, and then pointed out in the claim.

Reference is to be had to the accompanying drawings, forming a part of this specification, in which similar letters of reference indicate corresponding parts in both the figures.

Figure 1 is a plan view of my improvement, and Fig. 2 is a sectional elevation of the same on the line *x x* of Fig. 1.

The disk A, having a perforated grating-surface, is secured to the wheel B, having a bearing with its ring on the flange C of the ring D, to which is secured the half-cylindrical hopper E, in which slides a plunger, F, provided with the handle G. The wheel B turns loosely on a shaft, H, projecting downward and secured to the hopper E. In the center of the wheel B is secured the beveled pinion I, meshing into the beveled gear-wheel J, mounted on a stud secured to the hopper E. A handle, K, is attached to the face of the said wheel J.

Clamps L, attached to and projecting from the hopper E, serve to fasten the entire machine to a table or board by means of screws M, or other devices.

The operation is as follows: The machine is secured to a table or board, as above described, and the plunger F is removed, so as to permit of filling the hopper with the nuts to be grated. The plunger F is again inserted, and the operator then turns the handle K of the wheel J, which causes the latter to impart a revolving motion to the pinion I, its wheel B, and the disk A. The plunger F presses the nuts which are held in the hopper E against the grating-surface of the revolving disk A, whereby the nuts are grated, and the grated substance drops through the apertures in the disk A into a convenient vessel or upon a plate located beneath the machine.

The operator can increase or diminish the pressure of the plunger F upon the nuts by taking hold of the handle G and pressing the plunger downward.

Having thus fully described my invention, what I claim as new, and desire to secure by Letters Patent, is—

The combination, with the hopper having a pivot projecting downward from its lower open end and forming the axis of the grater-disk, and the separate inward-flanged ring secured on the lower end of the hopper concentric with the said pivot, of the grater-disk within the ring and upon its flange, the bevel-gear upon the center of the upper surface of the grater-disk and having a vertical aperture receiving the said pivot on which it revolves, and the bevel driving-gear journaled on the hopper and operating the bevel-gear on the grater-disk, substantially as set forth.

OSCAR DOMALSKI.

Witnesses:
JOHN RICHELMANN,
PETER GEHRING.